United States Patent [19]

Switzgable

[11] 3,991,936
[45] Nov. 16, 1976

[54] HEAT TRANSFER SYSTEM

[76] Inventor: Harold Switzgable, P.O. Box 171, Monmouth Junction, N.J. 08852

[22] Filed: Nov. 26, 1975

[21] Appl. No.: 635,560

[52] U.S. Cl. .............................. 237/1 A; 126/271; 126/400; 165/96; 165/104 S; 62/383; 219/325; 219/302
[51] Int. Cl.² .......................................... F24J 3/02
[58] Field of Search ................ 62/2, 383; 237/1 A; 126/400, 271; 165/104 R, 104 S, 96; 219/341, 302, 325, 378, 340, 365

[56] References Cited
UNITED STATES PATENTS

| | | | |
|---|---|---|---|
| 2,342,211 | 2/1944 | Newton | 165/104 S |
| 3,077,539 | 2/1963 | Blau, Jr. et al. | 126/400 |
| 3,229,755 | 1/1966 | Komaron | 62/383 |
| 3,390,672 | 7/1968 | Snelling | 126/271 |
| 3,773,031 | 11/1973 | Laing et al. | 219/325 |
| 3,779,232 | 12/1973 | Schroder | 126/400 |
| 3,884,292 | 5/1975 | Pessolano et al. | 165/96 |

*Primary Examiner*—John J. Camby
*Assistant Examiner*—Henry C. Yuen
*Attorney, Agent, or Firm*—Sperry and Zoda

[57] ABSTRACT

A heat transfer system including a thermally insulated tank defining a chamber therein which contains eutetic salt material for retaining high volumes of heat, the chamber inside of the tank is airtight with respect to the atmosphere, a conduit such as a pipe passes through the walls of the tank at two locations to provide a winding within the chamber such that as heated fluid is passed through the conduit, heat is retained by the eutetic salt material within the chamber, a portion of the walls of the tank having protruding sections which extend inward into the eutetic salt solution, the system including a heat sink adapted to be placed in thermal communication with the walls of the protrusions to withdraw heat selectively from the eutetic salt solution, a pump and sump system for recirculating the heated fluid from the conduit through a solar panel for heating and a blower and plenum area for passing air over the heat sink to provide a source of heated air.

19 Claims, 1 Drawing Figure

U.S. Patent    Nov. 16, 1976    3,991,936
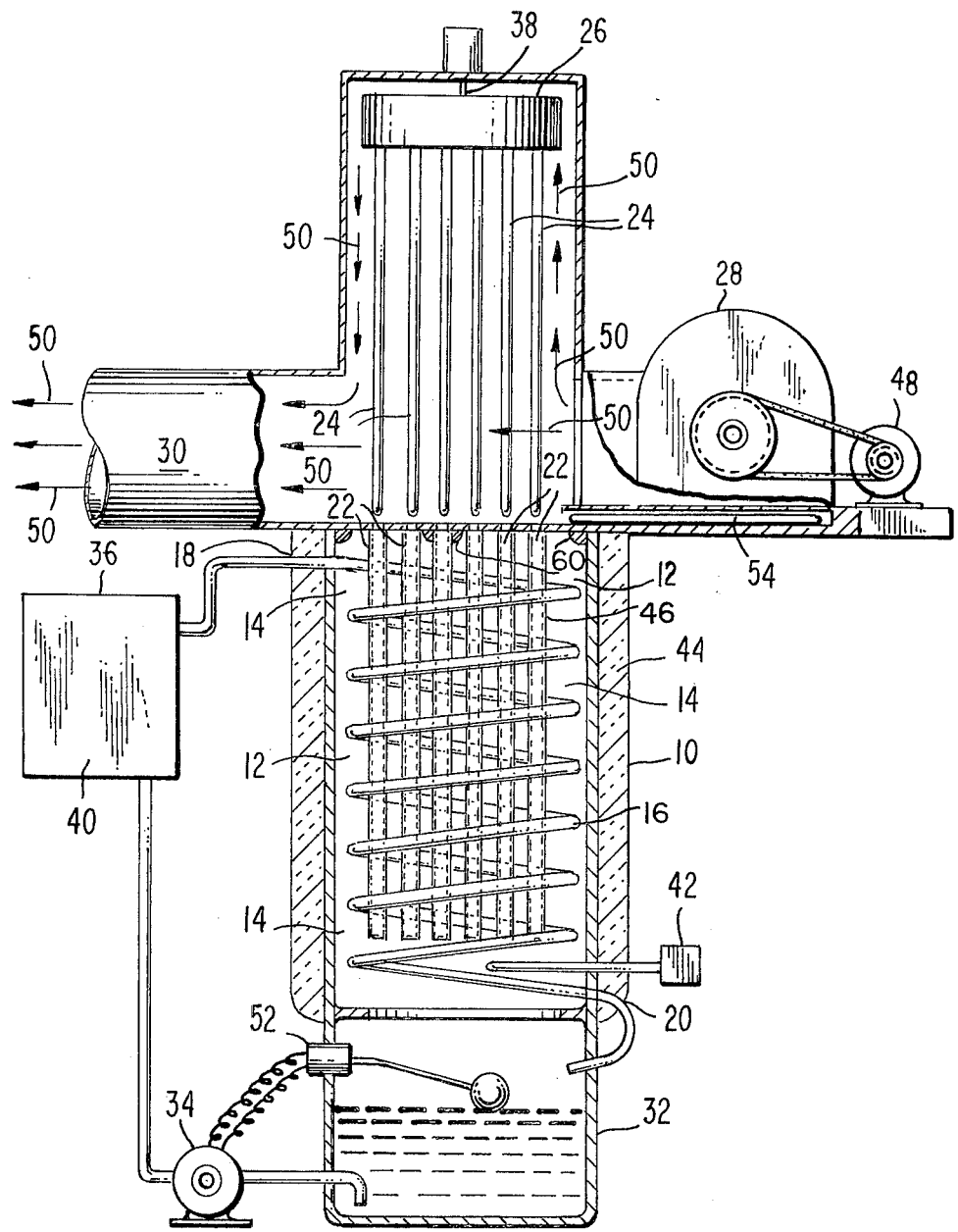

3,991,936

HEAT TRANSFER SYSTEM

BACKGROUND OF THE INVENTION

Field of Art

The present heat transfer system is able to be utilized by any system in which the conservation of heat and other energies is desired. In particular, the system of the present invention is particularly adaptable for use in household heating systems.

In a normal household, a large surface area for the location of solar panels is available in a convenient location such as on the roof. During the daylight hours continuous source of heat is available by these solar panels which is minimally affected by the external atmospheric temperature. During the daylight hours, this excess amount of solar heat available can be used to continually add heat to the eutetic salt solution and thereby provide a storage capacity for heat which is far in excess of that available in water and other heat storage materials. The eutetic salts usable with the present invention have melting points of from 200° to 750° which can be varied according to the needs and usages of the particular system.

During the daytime the continual influx of heat into the eutetic salt solution will increase the temperature thereof such that during the evening hours when the solar panels are inactive, enough heat will be stored in the eutetic salt solution to provide a continual source of heat to the house through the night until dawn when the solar panels will again be reactivated.

The cost of heating a home when considering contemporary fossil and other fuel costs is extremely great and such an inexpensive system designed for continuous operation such as is subject of the present invention is useful in reducing the cost of heating and in energy conservation.

Many prior systems have used solar heating panels but problems with such limited systems arise due to the fact that the heating capacity is only available during the daylight hours when heating to increase the temperature of the house is least required. Attempts to overcome these problems have included various systems for storing heat but the usual storage material is water or other similar materials which have a limited heat storage capacity. Eutetic salts which melt in the range of 200° to 700° F. provide a heat storage capacity of as much as ten times that of water. The advantages of material having such a large heat storage capacity are apparent.

Other prior art systems have experienced great difficulty in selectively controlling the drawing of heat from the heat storage material. The present application provides a system for closely controlling the amount of heat withdrawn from the heat storage material and transferring this heat as hot air or other available heat sources to the household or other environment.

Other prior art systems have required very elaborate structures for providing an intimate contact between the heat input system, the heat output system and the heat storage system. The present system of this invention provides a novel means for heating a thermally insulated eutetic salt solution while at the same time providing a heat withdrawing system which can be intimately positioned with respect to the eutetic salt while at the same time being capable of close control of the amount of heat withdrawn.

SUMMARY OF THE INVENTION

The basic structure of the present invention includes a tank which has walls which are mostly thermally insulated but which do include a thermally conductive wall section in which a plurality of protrusions extend inwardly as part of the wall within the chamber defined within the tank. The interior portion of the tank is a sealed environment and contains therein eutetic salts with as little moisture as possible.

A plurality of rod members are attached to a heat sink and are positioned adjacent the tank in the neighborhood of the locations of the protrusions. The rod members are adapted to be selectively placed in the protrusions to facilitate thermal flow from the eutetic solution within the chamber through the heat conducting walls of the protrusions into the rod members, thus providing thermal communication to the heat sink. In this manner heat is withdrawn from the eutetic salt to a position adjacent the tank in which a blower is positioned to blow air over the heat sink and rod members to thereby provide a source of hot air in a plenum area immediately adjacent the blower system and tank.

To provide additional amount of heat to the eutetic salt, a thermally conductive conduit means such as tubing or the like extends through one of the walls of the tank into the chamber and thereby abuts the eutetic salts to supply additional heat thereto. The tubing may extend through one wall and out through another wall and wind about throughout the interior chamber to provide additional surface area of abutment between the eutetic salt material and the conduit to increase thermal flow therebetween.

The inlet of the piping may be connected to a source of heated fluid material such as a solar panel or the like which has water or a water and antifreeze solution flowing therein. This heated solution passes through the insulated wall of the tank into the interior of the chamber to supply heat thereto. After most of the heat is extracted from the conduit into the eutetic salt solution, the cooled fluid will pass through the conduit outlet located in the wall of the tank to a fluid reservoir such as a sump or the like.

To aid in the regeneration of this system, the sump can be used to aid in regeneration of the heated fluid by providing a pump adjacent thereto such that as the cooled fluid in the sump reaches a predetermined level, the pump will be actuated to lift the solution in the sump through the solar panel to receive heat therefrom and then into the conduit inlet to again provide additional heat to the eutetic salt solution. In this way the heating fluid will regenerate itself and provide a continuous supply of heat to the eutetic salt solution during all times when the solar panel is being heated.

An auxiliary and supplemental electric heating element may be provided in thermal conductive flow with respect to the interior of the chamber such that the eutetic salt solution may be heated electrically at selective times whenever periods of inactivity of the solar panels are experienced such as on a series of cloudy days.

It is a primary object of the present invention to provide a means for using a heretofore untapped energy source i.e., solar heating.

It is an object of the present invention to provide a heat transfer system which takes its heat from a periodic heat source and stores the heat in such a manner that it is available as a continuous heat source for usage.

It is an object of the present invention to provide a heat storage system which provides intimate contact between the heat input, the heat output, and the heat storage materials.

It is an object of the present invention to provide a continuous source of heat for a normal household at a very minimal cost.

It is an object of the present invention to provide a simple and inexpensive heating system which is well within the financial capabilities of the average household.

It is an object of the present invention to provide a continuously regenerating system which utilizes a free solar energy source to take the place of expensive fossil fuel.

It is an object of the present invention to provide a heat transfer and heat storage system which has a storage capacity much greater than the storage capacity of water.

It is an object of the present invention to provide a solar heat source and storage capacity which includes auxiliary apparatus for use during limited solar heating.

It is an object of the present invention to provide a heat storage and transfer system which utilizes a continuously regenerating heat supply fluid.

It is an object of the present invention to provide a heat storage system which allows very close and accurate control of heat withdrawn therefrom.

It is an object of the present invention to provide a heat storage system with an increased storage capacity.

It is an object of the present invention to provide a heat storage system which includes a close intimate contact between the heat input conduit, the heat output conduit, and the heat storage material within a thermally insulated chamber.

BRIEF DESCRIPTION OF THE DRAWINGS

While the invention is particularly pointed out and distinctly claimed in the concluding portions therein, a preferred embodiment is set forth in the following detailed description which may be best understood when read in connection with the accompanying drawing, in which:

The FIGURE is a schematic drawing of a preferred embodiment of the present invention.

DETAILED DESCRIPTION OF THE PREFERRED EMBODIMENT

The present invention includes a tank or similar structure 10 which has walls having thermally insulating sections 44 and thermally conductive sections 46. The tank 10 defines therein a chamber 12 having heat storage material 14 such as eutetic salt or the like located therein. The chamber interior 12 is a sealed system such that fluid flow communication between the chamber and the external environment is prohibited by the air tight walls of tank 10 and by seals 60.

To provide heat to the heat storage material 14, a conduit means 16 is positioned to thermally communicate with the heat storage material 14. Conduit means 16 includes an inlet 18 and an outlet 20. Heated fluid material flows in through the pipe shaped conduit means 16 at inlet 18 and flows about through the conduit means which is configured to pass through the eutetic salt material 14 to provide heat thereto before the heated fluid material passes through outlet 20. To facilitate thermal conduction between conduit means 16 and heat storage material 14, the conduit means can be configured to wind throughout the interior of chamber 12 to provide a maximum amount of surface area in which the surface of the conduit means 16 contacts the heat storage material to provide an increased amount of thermal flow therebetween. As the cooled fluid flows out of outlet 20 it may be collected in sump 32.

To withdraw heat from the eutetic salt solution a plurality of protrusions 22 are configured in the thermally conductive sections 46 of tank 10. Similarly a plurality of rod members 24 are positioned to selectively be placed adjacent protrusions 22 such that heat flow from the heat storage material 14 through the thermally conductive sections 46 into the protrusions 22 will continue into the rod members 24. Then the rod members 24 will be in thermal communication with the heat sink 26 which is in the form of a small radiator type assembly.

When the rod members 24 and the heat sink 26 are withdrawn from the protrusions 22, motor 48 will operate to actuate blower means 28 which causes air to flow along the paths shown by arrows 50. In this manner, the air traveling along these directions will be heated by contacting rod members 24 and heat sink 26 and this heated air will hence be blown through plenum area 30 and provide a convenient source of heat for the household or other required usages.

To facilitate operation of the system, the regeneration of the heat supplying fluid can be provided by the use of a pump means 34 which is responsive to the level of fluid within the sump 32 through a standard level sensing means 52 to cause pump 34 to be actuated. When actuated, pump 34 will pump fluid from sump 32 into a heating means 36 such as a solar panel 40 or the like. During the daylight hours the solar panel 40 will heat the fluid and thereby cause it to flow through inlet 18 to heat the eutetic or other heat storage material 14. During periods of limited solar activity on alternate electrical heating element 42 may be positioned in abutment with the eutetic salt solution within the chamber 12 to temporarily continue the operation of the entire system until solar heating is again available. Also a windmill or other windpower system can be used to operate electric heater 42 or to heat fluid passing through inlet 18.

One of the primary advantages of the present system is the very close and accurate control of heat output which is available by the use of the rod members 24 and the heat sink 26. A push rod means 38 can be used as shown in this particular embodiment to urge the heat sink and rod members downward into protrusions 22. This push rod means 38 can be responsive to the required heat such that the elements 24 will be placed at varying distances into the protrusions 22 to vary the amount of heat flowing upward therefrom. At the same time this control of the amount of heat drawn from the eutetic solution will also control the amount of surface area available to the blower to conduct heated air along lines 50 and out through plenum area 30. To increase the efficiency of the transfer of heat from the protrusions 22 to the heat sink 26 the rod members 24 can be configured in the forms of "heat pipes". Heat pipes are commonly known in the field of heat transfer art to be sealed devices having a fluid therein which by a phenomenon of continuous condensing and evaporating will convey heat at a greater rate than heretofore possible.

To minimize the amount of heat lost through the protrusion 22 a cover 54 may be utilized to be selectively placed over the protrusion areas to provide a double wall structure in the area of the thermally conductive sections 46 such that heat flow out of the protrusions during periods when the push rod means 38 has completely withdrawn the rod numbers 24 from the protrusions 22 will be minimized. The heat loss from eutetic salts and other heat storage material 14 will be very slight since the other areas of the walls of tank 10 will consist of the thermally insulated sections.

One of the primary advantages of the present invention is the greatly increased total heat storage capacity which is available by the sealed tank and chamber system in which eutetic salts are positioned therein. Eutetic salts such as sodium hydride and various other sulphur compounds have a great amount of heat storage capacity. The heat storage capacity of some eutetic salts can be as great as ten times that of an equal volume of water.

The present system provides an apparatus for intimately securing contact between the heat input conduit 16 and the heat output protrusions 22 and the eutetic salt materials 14. Prior systems have had great difficulty in having a very close contact between these three elements in order to maximize thermal conductivity therebetween while at the same time allowing a close and accurate control of the amount of heat drawn therefrom. The present apparatus can be especially adaptable for use with a standard home having large roof surface areas for holding solar panels 40. Also a full supply of heat to the etuetic salts can be provided by wind generated (windmills etc.) resistance heaters.

The present concept has chief advantages in the regenerating system utilizing the pump 34 and sump 32 which will continually supply cooled heating solution to the solar panels 40. Another regenerative aspect of the present application is the use of eutetic salts as the heat storage material 14. The eutetic salts will be located within a sealed environment in chamber 12 and thereby will allow the repeated heating and cooling of the heat storage material without the need for regeneration thereof.

While particular embodiments of this invention have been shown in the drawings and described above, it will be apparent that many changes may be in the form, arrangement and positioning of the various elements of the combination. In consideration thereof it should be understood that preferred embodiments of this invention disclosed herein are intended to be illustrative only and not intended to limit the scope of the invention.

I claim:

1. A heat transfer system comprising:
   a. a tank defining a chamber therein;
   b. heat storage material located within said chamber;
   c. fluid conduit means extending inward through a wall of said tank into said chamber and extending outward through a wall of said tank, said conduit means defining an inlet and outlet, said inlet being connected to receive heated fluid material to flow therethrough, the wall of said conduit means contacting said heat storage material to supply heat thereto;
   d. a plurality of hollow protrusions of a wall of said tank into said chamber, the external surface of said protrusions being insulated from fluid flow communication with said chamber;
   e. a plurality of rod members positioned adjacent said protrusions and adapted to selectively be positioned in said protrusions to provide thermal flow flow therebetween; and
   f. a heat sink in thermal communication with said rod members, said heat sink providing a source of heat.

2. The system as defined in claim 1 further comprising a blower means positioned to blow air over said rod members and a plenum area to receive heated air and provide a usable source of heated air.

3. The system as defined in claim 1 further comprising:
   a. a sump connected to said outlet to provide a reservoir for heated fluid;
   b. pump means for pumping heated fluid from said sump; and
   c. a heating means connected to said pump to receive fluid therefrom and connected to said inlet to supply heated fluid thereto.

4. The system as defined in claim 3 wherein said heating means is a solar heated panel.

5. The system as defined in claim 3 wherein said pump means is responsive to be actuated in response to a predetermined level of fluid within said sump.

6. The system as defined as claim 1 further comprising a push-rod means secured to said heat sink to selectively urge said rod members toward said protrusion.

7. The system as defined in claim 1 further comprising an alternate electrical heating element in thermally conductive contact with said chamber.

8. The system as defined in claim 1 wherein said tank is thermally insulated to inhibit heat flow between said chamber and the external environment.

9. The system as defined in claim 1 wherein said tank provides an air tight seal of said chamber with respect to the external environment.

10. The system as defined in claim 1 wherein said heat storage material is provided by a combination of at least one eutectic salt.

11. The system as defined in claim 1 wherein said conduit means is in the form of a pipe wherein the interior of the pipe provides fluid flow communication between said inlet and said outlet, the interior of said pipe being sealed to prevent fluid flow communication between said chamber and the interior said pipe.

12. The system as defined in claim 1 wherein said conduit means is thermally conducted.

13. The system as defined in claim 1 wherein at least a portion of said protrusions is formed by a wall section made of stainless steel.

14. The system as defined in claim 1 further comprising a cover means adapted to be selectively placed over said protrusions to minimize heat flow from said protrusions into the external environment.

15. The system as defined in claim 1 wherein said protrusions are thermally conducted.

16. The system as defined in claim 1 wherein said rod members are made of stainless steel.

17. The system as defined in claim 1 wherein said rod members are heat pipes.

18. The system as defined in claim 1 wherein said heat sink is made of aluminum.

19. A heat transfer system comprising:
   a. a thermally insulated tank defining a chamber therein, said chamber being air tight with respect to the external environment;
   b. a eutectic salt material located within said chamber;

c. thermally conductive conduit means extending inward through a wall of said tank into said chamber and extending outward through a wall of said tank, said conduit means defining an inlet and an outlet, said inlet being connected to receive heated fluid material to flow therethrough, the walls of said conduit means contacting said eutectic salt material to supply heat thereto;

d. a plurality of hollow protrusions of a wall of said tank into said chamber, the outer surface of said protrusions being insulated from fluid flow communications with said chamber;

e. a plurality of heat pipes positioned adjacent said protrusions and adapted to be selectively be positioned into said protrusions to provide thermal flow therebetween;

f. a heat sink in thermal communication with said heat pipes, said heat sink providing a source of heat for any desired purpose;

g. a sump connected to said outlet to provide a reservoir for heated fluid;

h. a pump means for pumping heated fluid from said sump, said pump being responsive to a predetermined level of fluid within said sump;

i. a solar heating panel connected to said pump to receive fluid therefrom and connected to said inlet to supply heated fluid thereto; and j. a push-rod means secured to said heat pipes to selectively urge them into said protrusions.

* * * * *

UNITED STATES PATENT AND TRADEMARK OFFICE
CERTIFICATE OF CORRECTION

PATENT NO. : 3,991,936
DATED : November 16, 1976
INVENTOR(S) : Harold Switzgable It is certified that error appears in the above-identified patent and that said Letters Patent are hereby corrected as shown below:

In the Claims:

Column 6, line 3, Claim 1 e delete the second occurrence of the word "flow" such that it reads e) a plurality of rod members positioned adjacent said protrusions and adapted to selectively be positioned in said protrusions to provide thermal flow therebetween; and Column 7, line 16, Claim 19 e delete the word "be" located before the word positioned.

Signed and Sealed this

Eighth Day of February 1977

[SEAL]

Attest:

RUTH C. MASON
*Attesting Officer*

C. MARSHALL DANN
*Commissioner of Patents and Trademarks*